(12) United States Patent
Courjal et al.

(10) Patent No.: US 10,534,132 B2
(45) Date of Patent: Jan. 14, 2020

(54) METHOD FOR MANUFACTURING A PHOTONIC WAVEGUIDE AND PHOTONIC WAVEGUIDE MANUFACTURED BY SAID METHOD

(71) Applicants: Université de Franche-Comté, Besançon (FR); Centre National de la Recherche Scientifique, Paris (FR)

(72) Inventors: Nadège Courjal, Beure (FR); Fabien Henrot, Bensançon (FR); Étienne Fizaine, Besançon (FR); Clément Guyot, Besançon (FR)

(73) Assignees: UNIVERSITÉ DE FRANCHE-COMTÉ, Besançon (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 253 days.

(21) Appl. No.: 15/537,804

(22) PCT Filed: Dec. 18, 2015

(86) PCT No.: PCT/FR2015/053657
§ 371 (c)(1),
(2) Date: Jun. 19, 2017

(87) PCT Pub. No.: WO2016/097658
PCT Pub. Date: Jun. 23, 2016

(65) Prior Publication Data
US 2017/0329083 A1 Nov. 16, 2017

(30) Foreign Application Priority Data
Dec. 19, 2014 (FR) ..................... 14 63008

(51) Int. Cl.
*H01S 4/00* (2006.01)
*G02B 6/13* (2006.01)
(Continued)

(52) U.S. Cl.
CPC ............. *G02B 6/13* (2013.01); *G02B 6/1223* (2013.01); *G02B 6/30* (2013.01);
(Continued)

(58) Field of Classification Search
CPC ......... G02B 6/305; G02B 2006/12195; G02B 6/25; G02B 6/13; G02B 6/4293; Y10T 29/49002; Y10T 29/49135
(Continued)

(56) References Cited

U.S. PATENT DOCUMENTS 5,738,798 A 4/1998 Leonard
6,813,432 B2 * 11/2004 Salib ...................... G02B 6/136
372/45.01
(Continued)

OTHER PUBLICATIONS

Gerthoffer, A., et al., "Strong reduction of propagation losses in LiNbO3 ridge waveguides," Optical Materials 2014;38:37-41.
(Continued)

*Primary Examiner* — Thiem D Phan
(74) *Attorney, Agent, or Firm* — Kenealy Vaidya LLP

(57) ABSTRACT

Some embodiments are directed to a method for manufacturing photonic waveguides and to photonic waveguides manufactured by this method.

15 Claims, 11 Drawing Sheets

(51) Int. Cl.
  *G02B 6/122* (2006.01)
  *G02B 6/30* (2006.01)
  *G02B 6/12* (2006.01)

(52) U.S. Cl.
  CPC ............ *G02B 2006/12097* (2013.01); *Y10T 29/49002* (2015.01); *Y10T 29/49135* (2015.01)

(58) Field of Classification Search
  USPC ....... 29/592.1, 428, 825, 830, 835, 846, 885
  See application file for complete search history.

(56) References Cited

U.S. PATENT DOCUMENTS

| | | | |
|---|---|---|---|
| 7,831,122 B2 * | 11/2010 | Kondou | ............... G02B 6/1228 385/129 |
| 2001/0026669 A1 | 10/2001 | Nashimoto | |
| 2009/0274418 A1 | 11/2009 | Holzwarth et al. | |

OTHER PUBLICATIONS

International Search Report for PCT Patent App. No. PCT/FR2015/053657 (dated Jan. 4, 2016) with partial English translation.
Written Opinion for PCT Patent App. No. PCT/FR2015/053657 (dated Jan. 4, 2016).

* cited by examiner

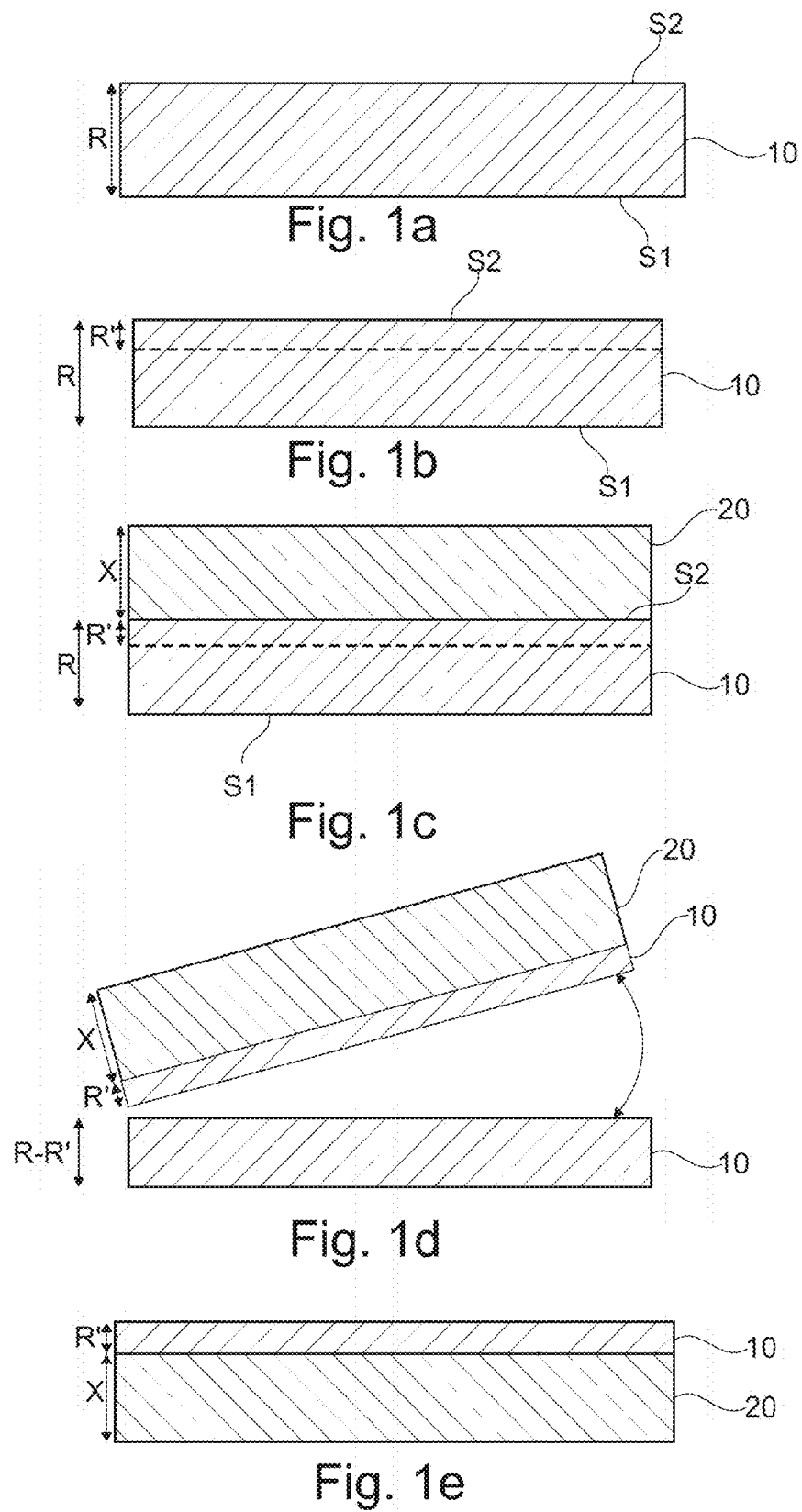

METHOD FOR MANUFACTURING A PHOTONIC WAVEGUIDE AND PHOTONIC WAVEGUIDE MANUFACTURED BY SAID METHOD

CROSS REFERENCE TO RELATED APPLICATIONS

This application is a National Phase filing under 35 C.F.R. § 371 of and claims priority of to PCT Patent Application No. PCT/FR2015/053657, filed on Dec. 18, 2015, which claims the priority benefit under 35 U.S.C. § 119 of French Application No.: 1462722, filed on Dec. 19, 2014, the contents of which are hereby incorporated in their entireties by reference.

BACKGROUND

Some embodiments relate to optical waveguides. More precisely, some embodiments relate to a method for manufacturing photonic waveguides and to photonic waveguides manufactured by this method.

Photonic waveguides have attracted much attention over the last thirty years, because of their potential ability to confine electromagnetic waves to reinforce non-linear electro-optical interactions.

Photonic waveguides are optical waveguides formed on thin dielectric substrates of a thickness between a few hundred nanometers and a few microns, and in which light is confined laterally either by etching material or by an index gradient.

One known method for manufacturing a photonic waveguide includes thinning a dielectric substrate by applying the ion implantation technique, and then forming an optical waveguide in the thinned dielectric substrate. FIGS. 1a-1g illustrate one example of this method.

In particular, FIG. 1a illustrates a dielectric substrate 10 having a first surface S1, a second surface S2 and a thickness R before thinning with the ion implantation technique. FIG. 1b illustrates the dielectric substrate 10 after ions have been implanted at a distance R' from the surface S2. Particularly, in FIG. 1b, the portion of the dielectric substrate 10 having a thickness R', which portion is defined by the dashed line, corresponds to the portion of the dielectric substrate 10 that has seen ion implantation. Next, as illustrated in FIG. 1c, the surface S2 of the dielectric substrate 10 is bonded or joined to another dielectric substrate 20, of a thickness X, which is known as the superstrate. Next, a step of cutting the dielectric substrate 10 is carried out in such a way that the superstrate 20 and the portion of the dielectric substrate 10, of a thickness R', that has been implanted with ions are separated from the portion of the dielectric substrate 10 of thickness R-R' (see FIG. 1d). FIG. 1e illustrates the portion of the dielectric substrate 10, of a thickness R', that remains after the dielectric substrate 10 has been thinned with the ion implantation technique. This remaining portion of the dielectric substrate 10, which has a thickness R' and which is bonded to the superstrate 20, corresponds to a thin dielectric substrate of a thickness between a few hundred nanometers and a few microns. This thin dielectric substrate resulting from the thinning of the dielectric substrate 10 forms a planar optical waveguide. Next, a microstrip optical waveguide is formed on the free surface of the dielectric substrate 10 having a thickness R', either via a step of ion exchange ($H^+$ for example, or $Na^+$ in glass) through a mask deposited beforehand, or by etching (dry ionic plasma etching or wet etching with hydrofluoric acid or by cutting with a precision circular saw) through a mask deposited beforehand.

In particular, FIG. 1f illustrates a perspective view of a microstrip photonic waveguide in which the portion of the dielectric substrate 10 (of a thickness R') remaining after the dielectric substrate 10 has been thinned is bonded to the superstrate 20. Furthermore, FIG. 1f illustrates the microstrip 4 of the microstrip optical waveguide formed in the remaining portion of the dielectric substrate 10 after the aforementioned ion-exchange step.

It will be noted that the etching (by ionic reactive plasma etching or by wet etching or by cutting-polishing with a circular saw) of the dielectric substrate 10 may be such that an optical waveguide having a "ridge" structure is formed on the dielectric substrate 10 instead of a microstrip optical waveguide. In this case, the photonic waveguide obtained is known as a ridge photonic waveguide.

In particular, FIG. 1g illustrates a perspective view of a ridge photonic waveguide in which the portion of the dielectric substrate 10 (of a thickness R') remaining after the dielectric substrate 10 has been thinned is bonded to the superstrate 20. Furthermore, FIG. 1g illustrates the ridge optical waveguide 6 formed in the portion of the dielectric substrate 10 remaining after the aforementioned etching. It will be noted that the ridge optical waveguide 6 may have on its surface a strip having a high refractive index. This high-refractive-index strip is represented by the hatched region of the surface of the ridge optical waveguide 6 in FIG. 1g. This region may for example be obtained by depositing a high-index dielectric prior to the etching, or by carrying out an ion exchange prior to the etching, in such a way that the ridge optical waveguide 6 ends up with a high-index strip on its surface.

Thus, FIGS. 1f and 1g show a photonic waveguide that includes a microstrip optical waveguide and a photonic waveguide that includes a ridge optical waveguide, respectively, these two waveguides being manufactured by the aforementioned known method, in which method the thinning of a dielectric substrate is achieved by implying the ion implantation technique.

It will be noted that one example of the aforementioned technique for thinning the dielectric substrate by ion implantation is slice cutting thin microcrystalline films (i.e. the "SmartCut" or "ion slicing" technique). This example is described in the publication by G. Poberaj et al. "*Ion-sliced lithium niobate thin films for active photonic devices, Optical Materials,* 31, 1054-1058 (2009)". Another example of a technique for thinning a dielectric substrate by ion implantation is ion-beam enhanced etching, which is described in the publication by R. Geiss et al. "*Light propagation in a free-standing lithium niobate photonic crystal waveguide, Applied Physics Letters,* 97, 131109 (2010)". In particular, these techniques consist in implanting ions (e.g. helium ions, protons or argon ions) at high-energy on a surface of a dielectric substrate and then in carrying out a chemical treatment (in hydrofluoric acid) or a heat treatment of this surface.

As mentioned above, the thickness R' of the portion of the dielectric substrate remaining after the dielectric substrate has been thinned with the ion implantation technique is between a few hundred nanometers and a few microns.

It has been observed that when the thickness R' is below 5 µm, a strong vertical confinement of the electromagnetic wave guided in the optical waveguide is obtained but at the same time substantial insertion losses (higher than 3 dB)

appear between the photonic waveguide and a standard single-mode optical fiber (of SMF28 type) coupled to the photonic waveguide.

It is known that insertion losses correspond to the contribution of coupling losses between the photonic waveguide and the standard single-mode optical fiber and of propagation losses of the electromagnetic wave over the length of the photonic waveguide. In the case of a thickness R' smaller than 5 µm, the coupling losses per facet with a standard single-mode fiber are typically higher than 3 dB. This is related to the low overlap between the confined optical mode of the photonic waveguide and the weakly confined optical mode of the standard single-mode fiber. These coupling losses per facet even exceed 10 dB if the thickness R' is smaller than 1 µm. Moreover, the propagation losses are higher than 0.7 dB/cm in the case where the thickness R' is smaller than 5 µm and these losses even exceed 2 dB/cm if the thickness R' is smaller than 1 µm.

It will be noted that vertical and/or lateral transition zones have been proposed to mitigate the problem of high insertion losses in photonic waveguides formed by the aforementioned thinning method. These transition zones consist in varying continuously and gradually the lateral or vertical dimension of the photonic waveguide at the end of the latter, so as to match the optical mode of the photonic waveguide to the weakly confined optical mode of the standard single-mode fiber. The gradual variation in the lateral or vertical dimension of the photonic waveguide occurs on the surface in which the microstrip optical waveguide or the ridge optical waveguide is formed. It will be noted that such a variation in guide height disrupts the guided electromagnetic wave, because optical modes other than the fundamental optical mode are also excited. Moreover, the production of these transition zones implies even more manufacturing steps (at the minimum at least one etching or deposition step in addition to the aforementioned steps in the known method for manufacturing a photonic microguide).

Furthermore, it will be noted that the ion implantation technique mentioned above with regard to the formation of photonic waveguides is very onerous to implement, and in particular energies of the order of a MeV must be provided for the implantation of the ions. Moreover, energies of the order of a MeV imply constraining safety conditions (buildings subject to strict standards, a medical visit before the start of work and periodic follow-up inspections).

Furthermore, it will be noted that thin dielectric substrates (of a thickness of 5 µm or less) bonded to a superstrate do not resist temperatures above 800° C., this preventing heat treatments such as diffusions or anneals from being carried out on the photonic waveguide. However, as is known to those skilled in the art, such a heat treatment may be important, in particular to decrease the roughness of the photonic waveguide and therefore propagation losses, or to measure high temperatures using the photonic waveguide.

There is therefore a real need to provide a method for manufacturing a photonic waveguide, which allows very thin dielectric substrate thicknesses, possibly smaller than 5 µm, to be obtained without substantial insertion losses between the photonic waveguide and a standard single-mode optical fiber, which at the same time is simple to implement without involving constraining safety conditions and without exciting optical modes other than the fundamental optical mode, and which allows photonic waveguides that are robust to high temperatures to be produced.

DESCRIPTION OF THE INVENTION

Some embodiments relate to a method for manufacturing a photonic waveguide with low insertion losses between the photonic waveguide and an optical fiber, the method including the following steps:
  forming an optical waveguide on a first surface of a dielectric substrate; and
  thinning the dielectric substrate in order to form a photonic waveguide having a first end and a second end opposite the first end;
  characterized in that the thinning is carried out by cutting a second surface of the dielectric substrate, which surface is opposite the first surface, the thinning comprising forming a recess the profile of which is parallel to the optical waveguide, the depth of the recess varying continuously and gradually between a first point of zero depth at the height of the second surface, and a maximum depth at a preset distance $I_q$ from the first end of the photonic waveguide, which end is intended to receive the optical fiber, the variation in the depth of the recess forming a vertical optical-mode transition zone of length $I_q$ between the photonic waveguide and the optical fiber.

Particular embodiments or features, which are usable alone or in combination, are:
  the optical waveguide is a microstrip optical waveguide including a high-refractive-index microstrip;
  after the dielectric substrate has been thinned, the microstrip is thinned to a minimum thickness between 300 nm and 5 µm;
  the optical waveguide is a ridge optical waveguide formed by a high-refractive-index strip and by cutting two recesses that are parallel and spaced apart by a distance $w_r$ on the first surface of the dielectric substrate, the cutting being such that the depth of the two recesses remains the same the entire length of the dielectric substrate;
  the optical waveguide is a ridge optical waveguide formed by a high-refractive-index strip and by cutting two recesses that are parallel and spaced apart by a distance $w_r$ on the first surface of the dielectric substrate, the cutting being such that the depth of each recess varies continuously and gradually between a zero depth at the height of the first end of the optical waveguide, which end is intended to receive the optical fiber, and a maximum depth at a preset distance $I_p$ from the first end of the optical waveguide, the variation in the depth of each recess forming a vertical optical-mode transition zone of length $I_p$ between the ridge optical waveguide and the optical fiber;
  after the dielectric substrate has been thinned, the strip is thinned to a minimum thickness between 300 nm and 5 µm;
  the depth of each recess decreases starting from the first end of the optical waveguide or starting from a preset distance from the first end of the optical waveguide;
  the cutting is such that the depth of each recess varies continuously and gradually between a zero depth at the height of the second end of the optical waveguide and a maximum depth at a preset distance $I_{p'}$ from the second end of the optical waveguide, which end is intended to receive an optical fiber, the variation in the depth of each recess forming a vertical optical-mode transition zone of length $I_{p'}$ between the ridge optical waveguide and the optical fiber;

the depth of the recess decreases starting from the first end of the photonic waveguide;

the depth of the recess decreases starting from a preset distance from the first end of the photonic waveguide;

the second surface of the dielectric substrate is cut such that the depth of the recess varies continuously and gradually between a second point of zero depth at the height of the second surface, and a maximum depth at a preset distance $I_p$, from the second end of the photonic waveguide, which end is intended to receive an optical fiber, the variation in the depth of the recess forming a vertical optical-mode transition zone of length $I_{p'}$ between the photonic waveguide and the optical fiber;

the depth of the recess decreases starting from the second end of the photonic waveguide or starting from a preset distance from the second end of the photonic waveguide;

the cutting is carried out by means of a circular saw including at least one blade;

the blade is gradually lowered to the maximum depth, so that the depth varies as a circular arc of radius equal to the radius of the blade;

Another subject of the invention relates to a photonic waveguide characterized in that it is manufactured by the method of the invention.

BRIEF DESCRIPTION OF THE FIGURES

The invention will be better understood on reading the following description, which is given merely by way of example, and with reference to the appended figures, in which:

FIG. 1a-1g show photonic waveguides manufactured by a prior-art method;

FIG. 8d shows a perspective view of the photonic waveguide of FIG. 8a flipped upside down in order to illustrate the ridge optical waveguide formed in the first surface of the photonic waveguide of FIG. 8a;

FIG. 9 shows one example of cutting of the second surface of the dielectric substrate carried out with a blade of a circular saw to manufacture the photonic waveguide of FIG. 4a;

EMBODIMENTS

Figure 2:
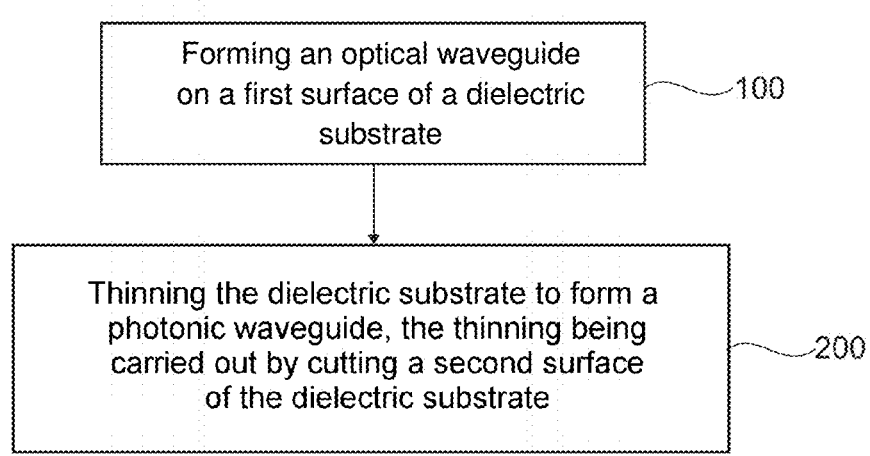
FIG. 2 shows a method for manufacturing a photonic waveguide according to one embodiment of the invention.

FIG. 2 shows one embodiment of a method for manufacturing a photonic waveguide having a first end A and a second end B opposite the first end A, and presenting low insertion losses, in comparison with the insertion losses of the photonic waveguide of the prior art, when it is coupled to a standard single-mode optical fiber (for example an SMF28 optical fiber with a weakly confined optical mode). It will be noted that the optical fiber mentioned in the description of the embodiments corresponds to a standard single-mode optical fiber. Furthermore, it will be noted that the figures do not illustrate the optical fiber, which is coupled to the first end A and/or to the second end B of the photonic waveguide. However, it will be noted that such coupling is well known to those skilled in the art.

In a step 100 of the method of FIG. 2, an optical waveguide is formed in a first surface S1 of a dielectric substrate 10.

Preferably, the dielectric substrate 10 is made of lithium niobate ($LiNbO_3$) since using lithium niobate ($LiNbO_3$) it is possible to obtain a substrate that is non-linear, electro-optical and piezoelectric. In another example, the dielectric substrate is made of doped glass. However, it will be noted that the dielectric substrate may be made of other types of material, provided that the electromagnetic wave can be guided in these materials.

Figure 3A:
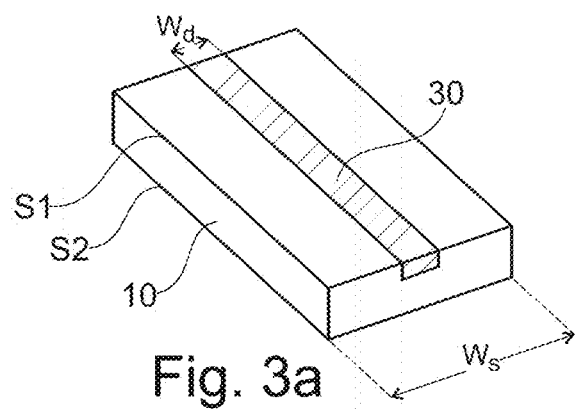
FIG. 3a shows one example of an optical waveguide formed in a first surface of a dielectric substrate in the first step of the method of FIG. 2.

According to one example illustrated in FIG. 3a, the optical waveguide formed on the first surface S1 of the dielectric substrate 10 is a microstrip optical waveguide. The microstrip optical waveguide includes a high-refractive-index microstrip 30 that is inscribed to a certain depth from the first surface S1 of the dielectric substrate 10 and that has a certain width $w_d$. The expression "high-refractive-index microstrip" refers to a zone in which the refractive index is higher than that of the dielectric substrate. In the case of an graded-index microstrip optical waveguide, the depth from the first surface S1 corresponds to the depth at half-maximum of the index profile, and the width $w_d$ of the microstrip 30 corresponds to the full width at half-maximum of the index profile. As illustrated in FIG. 3a, the width $w_d$ of the microstrip 30 is smaller than the width $w_s$ of the dielectric substrate 10. The electromagnetic wave is confined vertically by virtue of the microstrip 30 of width $w_d$ and it is guided along this zone of the microstrip 30. The microstrip 30 may be formed in the first surface S1 of the dielectric substrate 10 using various techniques that are well known to those skilled in the art. One example of these techniques is given in the publication "Armenise, M. N. *Fabrication techniques of lithium niobate waveguides Optoelectronics*, IEE Proceedings J, vol. 135, no. 2, pp. 85-91, April 1988". In particular, this publication especially describes that it possible to produce, by titanium diffusion, a microstrip optical waveguide from a deposit of a strip of titanium defined beforehand in a lithography step, and then diffused at a temperature of about 1030° C. It will be noted that the microstrip optical waveguide of FIG. 3a has a straight shape. However, in another example well known to those skilled in the art and not illustrated in the figures, the microstrip optical waveguide may have a curved shape (see for example the Mach-Zehnder optical waveguide that is well known to those skilled in the art).

Figure 3B:
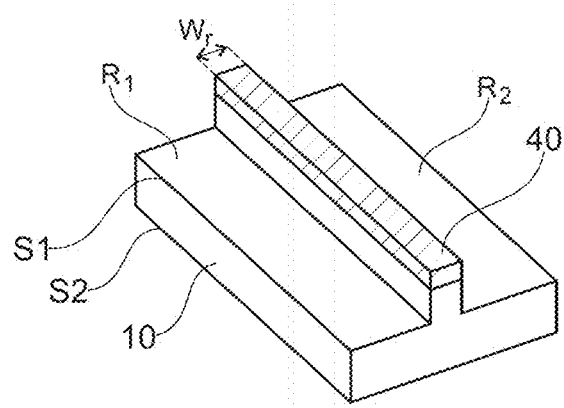
FIG. 3b shows another example of an optical waveguide formed in a first surface of a dielectric substrate in the first step of the method of FIG. 2.

According to another example illustrated in FIG. 3b, the optical waveguide formed in the first surface S1 of the dielectric substrate 10 is a ridge optical waveguide formed by a high-refractive-index strip 40 and by cutting two recesses R1, R2 that are parallel and spaced apart by a distance $w_r$ on the first surface S1 of the dielectric substrate, the distance $w_r$ corresponding to the width of the ridge optical waveguide. The expression "high-refractive-index strip" refers to a zone in which the refractive index is higher than that of the dielectric substrate. This strip may be formed with the same techniques as the microstrip 30 of FIG. 3a. As illustrated in FIG. 3b, the two recesses R1, R2 are cut such that the depth of these recesses remains the same over the entire length of the dielectric substrate 10, and this depth is larger than 10 μm. The optical waveguide of FIG. 3b is a conventional ridge optical waveguide. More information regarding the manufacture of the optical waveguide of FIG. 3c may be found in French patent application no. 1450795.

Figure 3C:
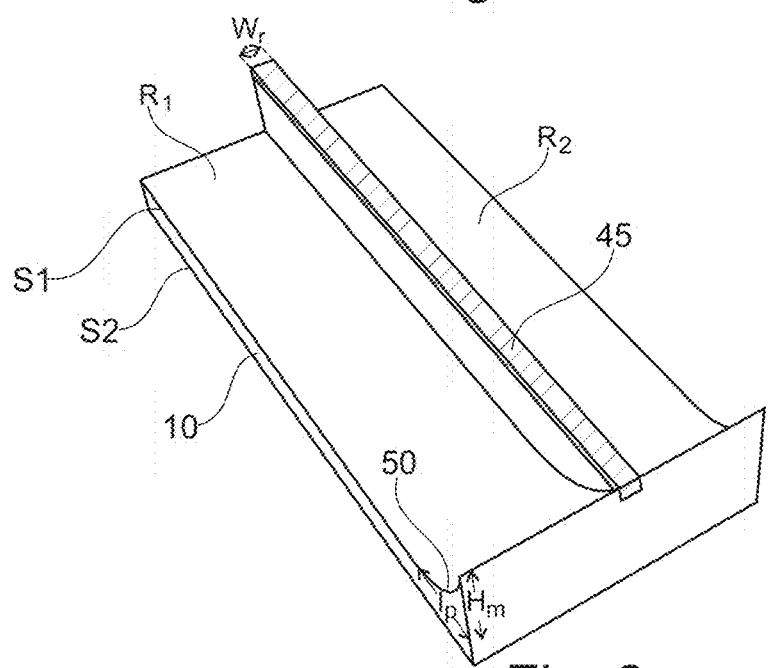
FIG. 3c shows another example of an optical waveguide formed in a first surface of a dielectric substrate in the first step of the method of FIG. 2.

According to another example illustrated in FIG. 3c, the optical waveguide formed in the first surface S1 of the dielectric substrate 10 is a ridge optical waveguide having a vertical optical-mode transition zone 50 between the optical waveguide and an optical fiber at the first end of the optical waveguide. In particular, the ridge optical waveguide of FIG. 3c is formed by a high-refractive-index strip 45 and by cutting two recesses R1, R2 that are parallel and spaced apart by a distance $w_r$ on the first surface S1 of the dielectric substrate 10, the distance $w_r$ corresponding to the width of the ridge optical waveguide. As illustrated in FIG. 3c, the two recesses (R1, R2) are cut such that the depth of each recess R1, R2 varies continuously and gradually between a zero depth at the height of the first end of the optical waveguide, which end is intended to receive the optical fiber, and a maximum depth $H_m$ at a preset distance $I_p$ from the first end of the optical waveguide, the variation in the depth of each recess (R1, R2) forming a vertical optical-mode transition zone 50 of length $I_p$ between the ridge optical waveguide and the optical fiber. More information regarding the manufacture of the optical waveguide of FIG. 3c may be found in French patent application no. 1450795.

As illustrated in the ridge optical waveguide of FIG. 3c, the depth of each recess R1, R2 decreases starting from the first end of the optical waveguide.

Figure 3D:
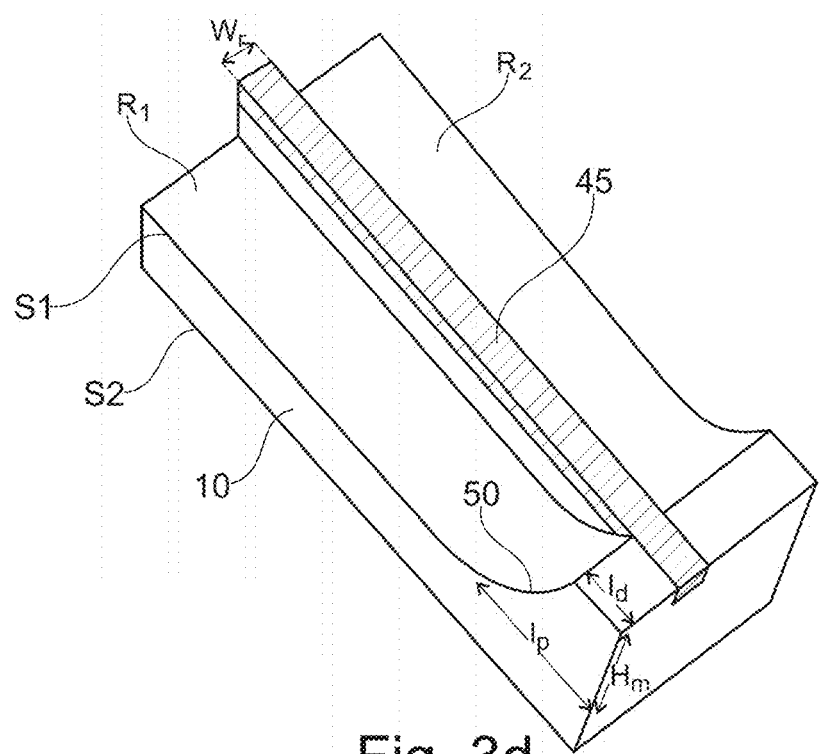
FIG. 3d shows another example of an optical waveguide formed in a first surface of a dielectric substrate in the first step of the method of FIG. 2.

However, in another example of a ridge optical waveguide illustrated in FIG. 3d, the depth of each recess R1, R2 decreases starting from a preset distance $I_d$ from the first end of the optical waveguide. It will be noted that the optical waveguide of FIG. 3d differs from the optical waveguide of FIG. 3c only in that the depth of each recess R1, R2 decreases starting from a preset distance $I_d$ from the first end of the optical waveguide. In particular, FIG. 3d illustrates a ridge optical waveguide formed by a high-refractive-index strip 45 and having a vertical optical-mode transition zone 50 between the optical waveguide and an optical fiber, in which the vertical transition zone 50 starts from a preset distance $I_d$ from the first end of the optical waveguide. More information regarding the manufacture of the optical waveguide of FIG. 3d may be found in French patent application no. 1450795.

It will be noted that the configuration of the ridge optical waveguide of FIG. 3d, in which the depth of each recess R1, R2 decreases starting from a preset distance $I_d$ from the first end of the optical waveguide, has the advantage of allowing a shim to be bonded to the portion of the surface of the dielectric substrate 10 of length $I_d$ that is not cut (see FIG. 7 of French patent no. 1450795). The shim serves to improve the bonding between the ridge optical waveguide and the optical fiber since it allows a ferrule to be bonded to the height of the first end of the optical waveguide in order to well fasten the optical fiber in the position in which it is coupled to the ridge optical waveguide.

Figure 3E:
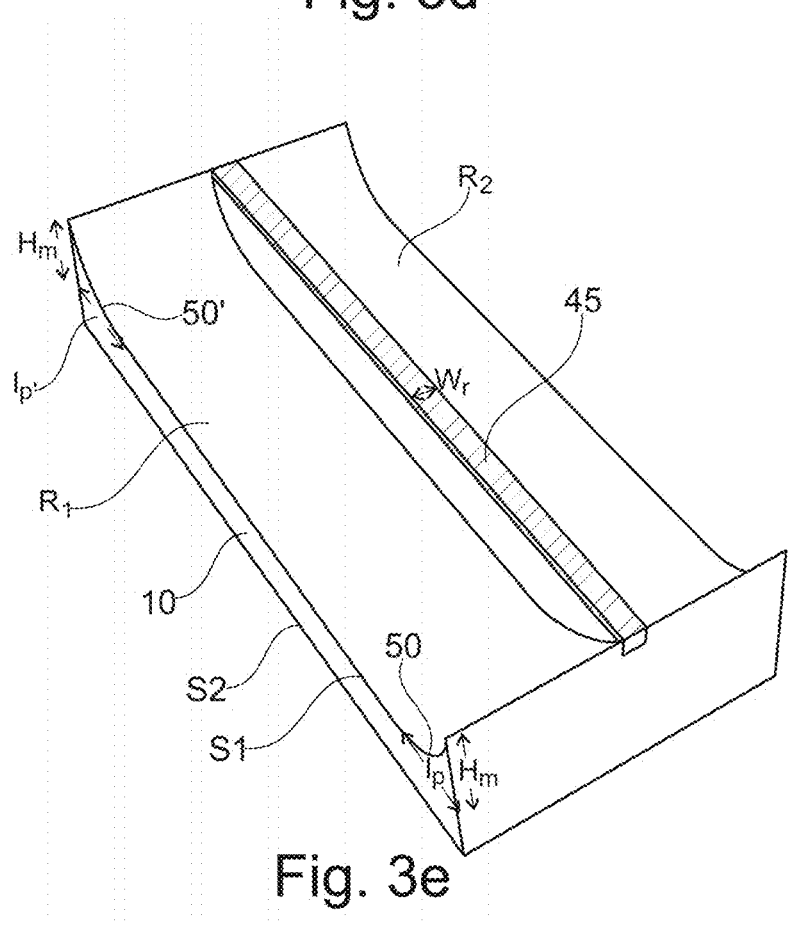
FIG. 3e shows another example of an optical waveguide formed in a first surface of a dielectric substrate in the first step of the method of FIG. 2.

According to another example illustrated in FIG. 3e, the optical waveguide formed in the first surface S1 of the dielectric substrate 10 is a ridge optical waveguide including a high-refractive-index strip 45 and comprising a vertical optical-mode transition zone 50 between the optical waveguide and an optical fiber at the first end of the optical waveguide and also at the second end of the optical waveguide. It will be noted that the optical waveguide of FIG. 3e differs from the optical waveguide of FIG. 3c only in that it includes a vertical optical-mode transition zone 50 between the optical waveguide and an optical fiber not only at the first end but also at the second end of the optical waveguide. In particular, in order to form the vertical transition zone 50 at the second end of the optical waveguide, the two recesses R1, R2 are cut such that the depth of each recess R1, R2 varies continuously and gradually between a zero depth at the height of the second end of the optical waveguide and a maximum depth at a preset distance from the second end of the optical waveguide. Thus, the variation in the depth of each recess R1, R2 forms a vertical optical-mode transition zone 50' of length $I_{p'}$ between the ridge optical waveguide and the optical fiber. It will be noted that the preset distance from the second end of the optical waveguide may be the same or may be different from the preset distance $I_p$ from the first end of the optical waveguide. More information regarding the manufacture of the optical waveguide of FIG. 3e may be found in French patent application no. 1450795.

It will be noted that in the example of the optical waveguide of FIG. 3e, the depth of each recess R1, R2 decreases starting from the first end and from the second end of the optical waveguide. However, in another example not illustrated in the figures, the depth of each recess R1, R2 decreases starting from a preset distance $I_d$ from the first end and from the second end of the optical waveguide. It will be noted that the preset distance $I_d$ from the first end of the optical waveguide may be the same or may be different from the preset distance $I_d$ from the second end of the optical waveguide.

In all the examples of FIGS. 3c-3e the vertical transition zone 50 and the vertical transition zone 50' have a rounded profile, preferably with a radius of curvature larger than 20 mm, since it has been observed that with such a radius of curvature optical losses in the vertical transition zone are lower than 0.1 dB. As is known by those skilled in the art, the optical losses in the vertical transition zone correspond to the ratio between the optical power exiting from the vertical transition zone and the optical power entering into of the vertical transition zone. However, in another example the profile of these zones has a linear shape. Furthermore, in another example, one portion of the profile of these zones may be rounded and another portion of the profile of these zones may be linear.

By way of example, the first surface S1 of the dielectric substrate 10 may be cut, to form the ridge optical waveguide in FIGS. 3b-3e, mechanically with a circular saw. In another example, the cutting is carried out by laser etching. More information regarding the cutting of the first surface S1 of the dielectric substrate 10 of FIGS. 3b-3e may be found in French patent application no. 1450795.

In a step 200 of the method of FIG. 2, the dielectric substrate 10 is thinned to form a photonic waveguide having a first end A and a second end B opposite the first end A.

In particular, the dielectric substrate 10 is thinned by cutting a second surface S2 of the dielectric substrate 10, which surface is opposite the first surface S1. Thus, after the optical waveguide has been formed on the first surface S1 of the dielectric substrate 10 (step 100), the dielectric substrate 10 is flipped in order to thin the second surface S2 of the dielectric substrate 10.

Figure 4A:
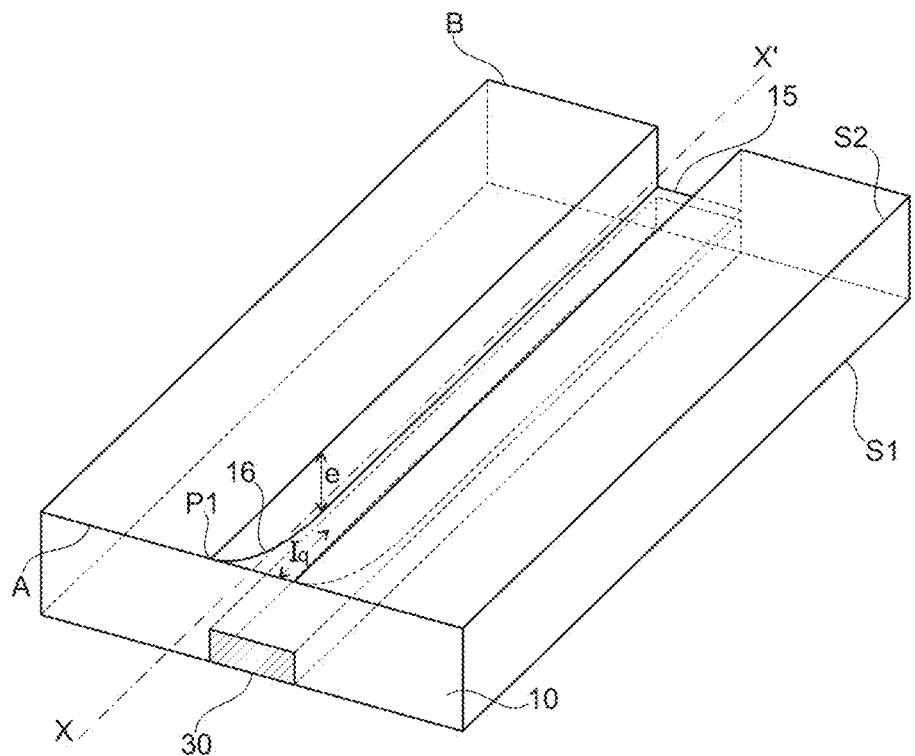
FIG. 4a shows a perspective view of the photonic waveguide formed according to an example of the second step of the method of FIG. 2, in which a second surface of the dielectric substrate opposite the first surface of the dielectric substrate of FIG. 3a is thinned.

FIG. 4a shows a perspective view of the photonic waveguide formed according to one example of step 200 of the method of FIG. 2, in which the second surface S2 of the dielectric substrate 10, i.e. the surface opposite the first surface S1 of the dielectric substrate 10 of FIG. 3, is thinned.

In particular, as illustrated in FIG. 4a, the thinning in the aforementioned step 200 comprises forming a recess 15 the profile of which is parallel to the microstrip 30 formed in the first surface S1 of the dielectric substrate 10 in the aforementioned step 100. The depth of the recess 15 varies continuously and gradually between a first point P1 of zero depth at the height of the second surface S2, and a maximum depth e at a preset distance $I_q$ from the first end A of the photonic waveguide, which end is intended to receive the optical fiber. The variation in the depth of the recess 15 forms a vertical optical-mode transition zone 16 of length $I_q$ between the optical waveguide and the optical fiber.

Figure 4B:
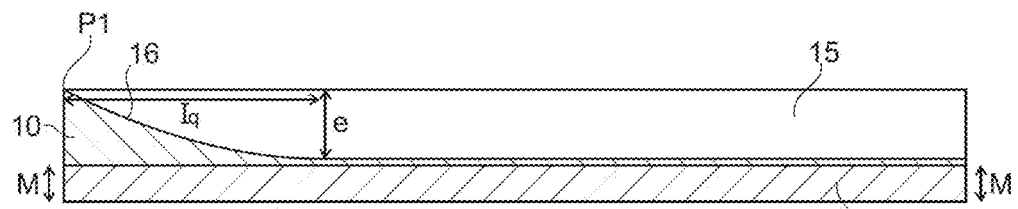
FIG. 4b shows a view of a transverse cross section taken along the axis X-X' indicated in FIG. 4a in the case where the microstrip has not been thinned.

FIG. 4b illustrates a view of a transverse cross section taken along the axis X-X' indicated in FIG. 4a in the case where the maximum depth e is such that the microstrip 30 is not thinned after the second surface S2 of the dielectric substrate has been thinned. As illustrated in FIG. 4b, the thickness M of the microstrip 30 after the second surface S2 has been thinned remains unchanged over the entire length of the photonic waveguide.

Figure 4C:
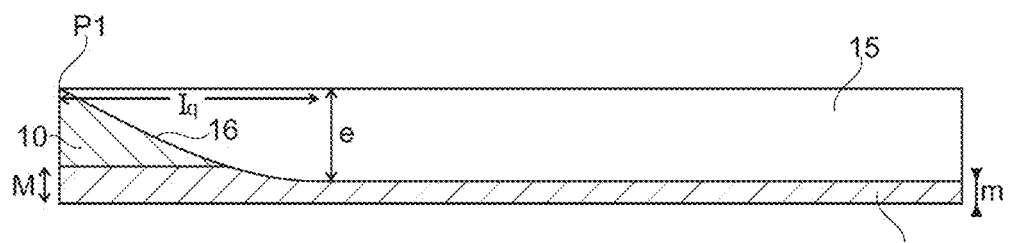
FIG. 4c shows a view of a transverse cross section taken along the axis X-X' indicated in FIG. 4a in the case where the microstrip has been thinned.

In contrast, FIG. 4c illustrates a view of a transverse cross section taken along the axis X-X' indicated in FIG. 4a in the case where the maximum depth e is such that the microstrip 30 is also thinned after the second surface S2 of the dielectric substrate has been thinned. As illustrated in FIG. 4c, a portion of the microstrip 30 has a thickness M and another portion of the microstrip 30 is thinned to a minimum thickness m.

In the examples of FIGS. 4a-4c, the depth of the recess 15 decreases starting from the first end A of the photonic waveguide.

However, in another example of thinning of the second surface S2 of the dielectric substrate 10 in step 200, the depth of the recess 15 decreases starting from a preset distance $I_b$ from the first end of the photonic waveguide. This decrease in depth is illustrated in FIGS. 5a-5c.

Figure 5A:
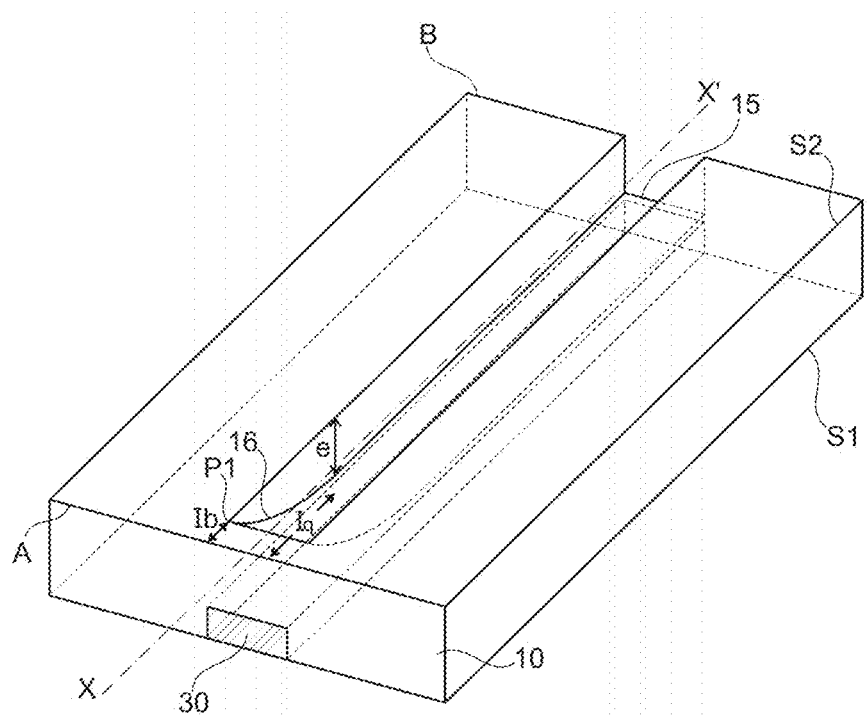
FIG. 5a shows a perspective view of the photonic waveguide formed according to another example of the second step of the method of FIG. 2, in which a second surface of the dielectric substrate opposite the first surface of the dielectric substrate of FIG. 3a has been cut.

In particular, as illustrated in FIG. 5a, the thinning in the aforementioned step 200 comprises forming a recess 15 the profile of which is parallel to the microstrip 30 formed in the first surface S1 of the dielectric substrate 10 in the aforementioned step 100. The depth of the recess 15 varies continuously and gradually between a first point P1 of zero depth at the height of the second surface S2, and a maximum depth e at a preset distance $I_q$ from the first end A of the photonic waveguide, which end is intended to receive the optical fiber. The point P1 of zero depth is located at a preset distance $I_b$ from the first end A. The variation in the depth of the recess 15 forms a vertical optical-mode transition zone 16 of length $I_q$ between the optical waveguide and the optical fiber.

Figure 5B:
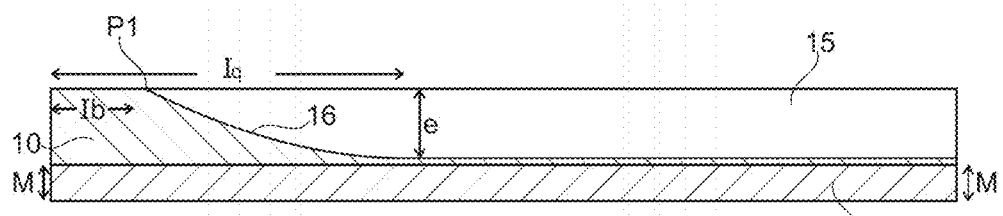
FIG. 5b shows a view of a transverse cross section taken along the axis X-X' indicated in FIG. 5a in the case where the microstrip has not been thinned.

FIG. 5b illustrates a view of a transverse cross section taken along the axis X-X' indicated in FIG. 5a in the case where the maximum depth e is such that the microstrip 30 is not thinned after the second surface S2 of the dielectric substrate 10 has been thinned. As illustrated in FIG. 5b, the thickness M of the microstrip 30 after the second surface S2 has been thinned remains unchanged over the entire length of the photonic waveguide.

Figure 5C:
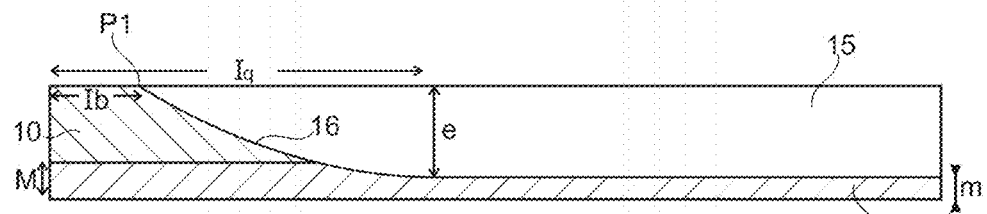
FIG. 5c shows a view of a transverse cross section taken along the axis X-X' indicated in FIG. 5a in the case where the microstrip has been thinned.

In contrast, FIG. 5c illustrates a view of a transverse cross section taken along the axis X-X' indicated in FIG. 5a in the case where the maximum depth e is such that the microstrip 30 is also thinned after the second surface S2 of the dielectric substrate 10 has been thinned. As illustrated in FIG. 5c, a portion of the microstrip 30 has a thickness M and another portion of the microstrip 30 is thinned to a minimum thickness m.

In another example of thinning of the second surface S2 of the dielectric substrate 10 in the step 200 (see FIG. 6a) the second surface S2 of the dielectric substrate 10 is cut such that the depth of the recess 15 varies continuously and gradually at both ends A and B of the photonic waveguide. In particular, apart from the variation in the depth of the recess 15 at the first end A, which is made the same as the variation in the depth of the recess 15 in FIG. 4a, the depth of the recess 15 also varies continuously and gradually between a second point P2 of zero depth at the height of the second surface S2, and a maximum depth e at a preset distance $I_q$, from the second end B of the photonic waveguide, which end is intended to receive an optical fiber. This variation in the depth of the recess 15 forms a vertical optical-mode transition zone 16' of length $I_q$, between the photonic waveguide and the optical fiber at the second end of the photonic waveguide. Thus, in FIG. 6a, the depth of the recess 15 decreases starting from the first end A (point P1) but also from the second end B (point P2) of the photonic waveguide. Thus, the photonic waveguide of FIG. 6a includes a vertical transition zone 16 at the first end A and a vertical transition zone 16' at the second end B of the photonic waveguide.

Figure 6A:
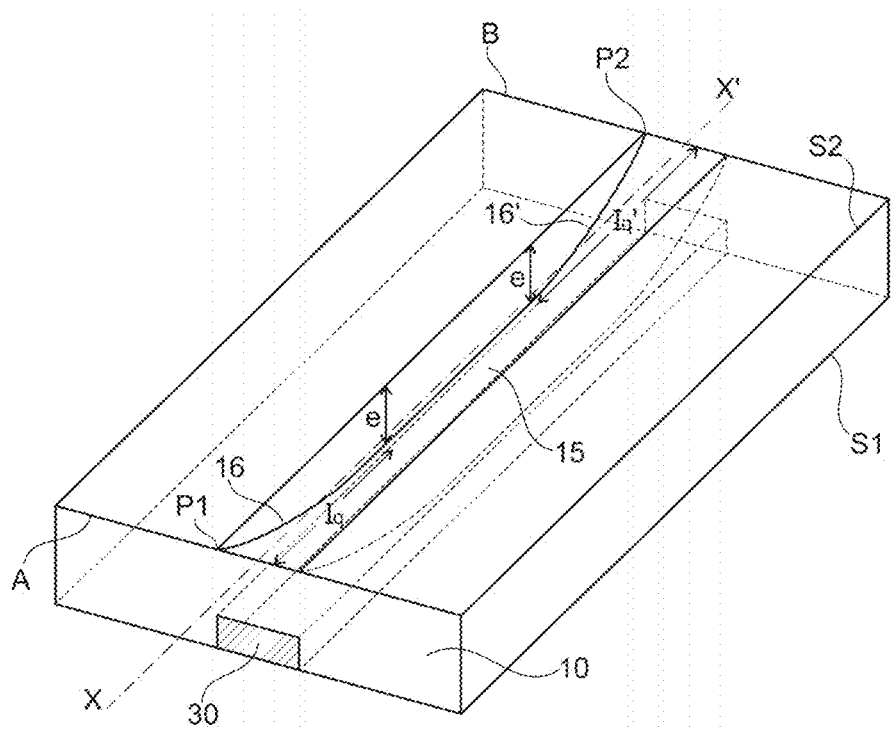
FIG. 6a shows a perspective view of the photonic waveguide formed according to another example of the second step of the method of FIG. 2, in which a second surface of the dielectric substrate opposite the first surface of the dielectric substrate of FIG. 3a has been cut.
Figure 6B:
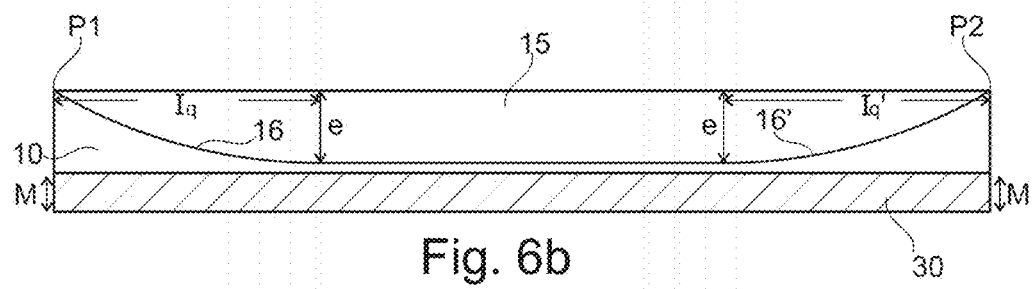
FIG. 6b shows a view of a transverse cross section taken along the axis X-X' indicated in FIG. 6a in the case where the microstrip has not been thinned.

FIG. 6b illustrates a view of a transverse cross section taken along the axis X-X' indicated in FIG. 6a in the case where the maximum depth e is such that the microstrip 30 is not thinned after the second surface S2 of the dielectric substrate 10 has been thinned. As illustrated in FIG. 6b, the thickness M of the microstrip 30 after the second surface S2 has been thinned remains unchanged over the entire length of the photonic waveguide.

Figure 6C:
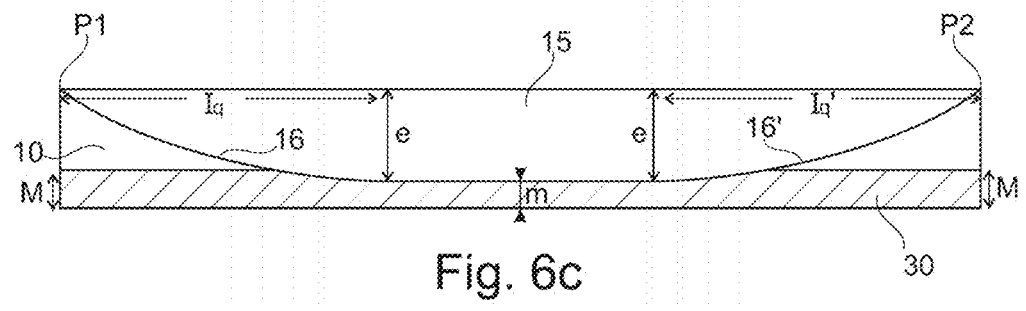
FIG. 6c shows a view of a transverse cross section taken along the axis X-X' indicated in FIG. 6a in the case where the microstrip has been thinned.

In contrast, FIG. 6c illustrates a view of a transverse cross section taken along the axis X-X' indicated in FIG. 6a in the case where the maximum depth e is such that the microstrip 30 is also thinned after the second surface S2 of the dielectric substrate 10 has been thinned. As illustrated in FIG. 6c, a portion of the microstrip 30 has a thickness M and another portion of the microstrip 30 is thinned to a minimum thickness m.

Figure 7A:
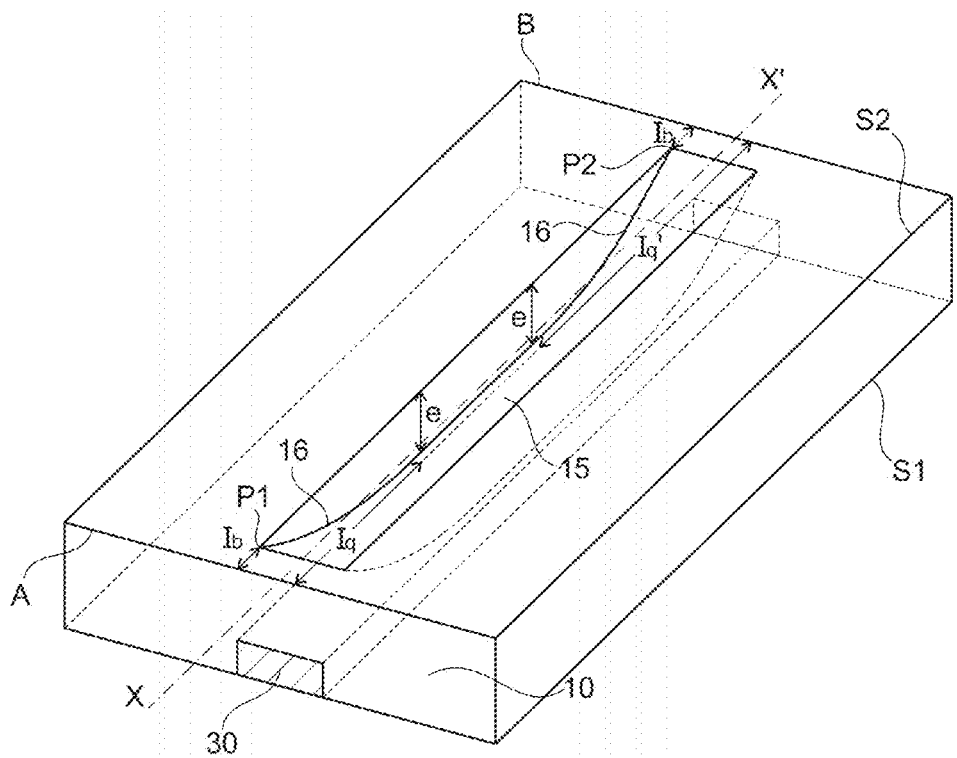
FIG. 7a shows a perspective view of the photonic waveguide formed according to another example of the second step of the method of FIG. 2, in which a second surface of the dielectric substrate opposite the first surface of the dielectric substrate of FIG. 3a has been cut.

In another example of thinning of the second surface S2 of the dielectric substrate 10 in step 200 (see FIG. 7a), the depth of the recess 15 decreases starting from a preset distance $I_b$ from the first end A and second end B of the photonic waveguide. In particular, FIG. 7a differs from FIG. 6a only in that the depth of the recess 15 decreases starting from a preset distance $I_b$ from the first end A and second end B of the photonic waveguide. In the example of FIG. 7a, the preset distance $I_b$ is the same from the first end A as from the second end B. However, in another example not illustrated in the figures, the preset distance $I_b$ from the first end A may be different from the preset distance $I_b$ from the second end B.

Figure 7B:
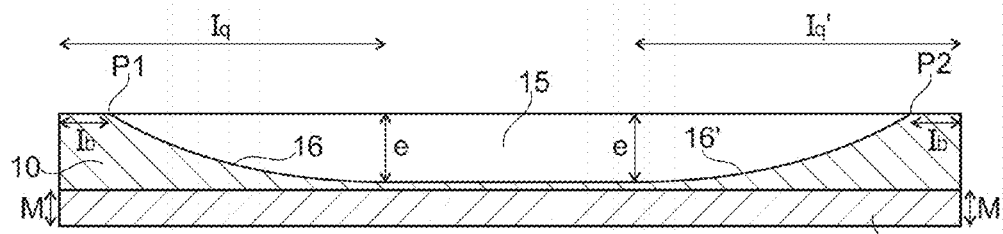
FIG. 7b shows a view of a transverse cross section taken along the axis X-X' indicated in FIG. 7a in the case where the microstrip has not been thinned.

FIG. 7b illustrates a view of a transverse cross section taken along the axis X-X' indicated in FIG. 7a in the case where the maximum depth e is such that the microstrip 30 is not thinned after the second surface S2 of the dielectric substrate 10 has been thinned. As illustrated in FIG. 7b, the thickness M of the microstrip 30 after the second surface S2 has been thinned remains unchanged over the entire length of the photonic waveguide.

Figure 7C:
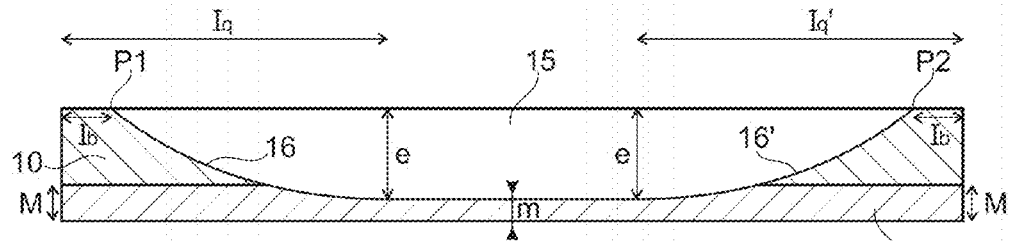
FIG. 7c shows a view of a transverse cross section taken along the axis X-X' indicated in FIG. 7a in the case where the microstrip has been thinned.

In contrast, FIG. 7c illustrates a view of a transverse cross section taken along the axis X-X' indicated in FIG. 7a in the case where the maximum depth e is such that the microstrip 30 is also thinned after the second surface S2 of the dielectric substrate 10 has been thinned. As illustrated in FIG. 7c, a portion of the microstrip 30 has a thickness M and another portion of the microstrip 30 is thinned to a minimum thickness m.

FIGS. 4a-4c, 5a-5c, 6a-6c and 7a-7c illustrate photonic waveguides formed after the second surface S2 of the dielectric substrate 10 of FIG. 3a has been thinned (step 200 of the method of FIG. 2) and in which the first surface S1 of the dielectric substrate 10 includes a microstrip 30 (step 100 of the method of FIG. 2).

However, the thinning of the second surface S2 of the dielectric substrate 10 according to the examples of FIGS. 4a-4c, 5a-5c, 6a-6c and 7a-7c may also be applied in the case of the dielectric substrate 10 of FIGS. 3b-3e.

Figure 8A:
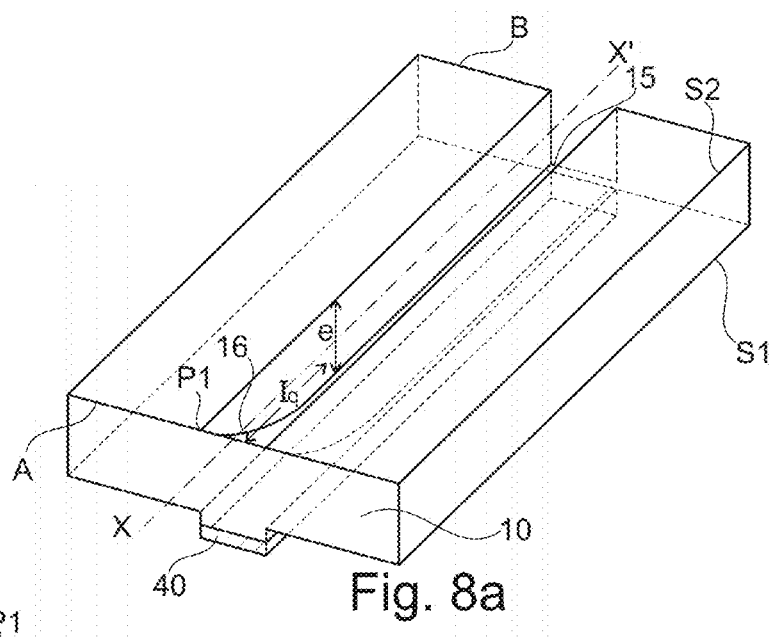
FIG. 8a shows a perspective view of the photonic waveguide formed according to one example of the second step of the method of FIG. 2, in which a second surface of the dielectric substrate opposite the first surface of the dielectric substrate of FIG. 3b has been thinned.

FIG. 8a illustrates an example of thinning of the second surface S2 of the dielectric substrate 10 of FIG. 3b, in which the first surface S1 of the dielectric substrate 10 includes a ridge optical waveguide. As illustrated in FIG. 8a, the thinning of the second surface S2 (in the aforementioned step 200) comprises forming a recess 15 the profile of which is parallel to the ridge optical waveguide formed in the first surface S1 of the dielectric substrate 10 (in the aforementioned step 100). The depth of the recess 15 varies continuously and gradually between a first point P1 of zero depth at the height of the second surface S2, and a maximum depth e at a preset distance $I_q$ from the first end A of the photonic waveguide, which end is intended to receive the optical fiber. The variation in the depth of the recess 15 forms a vertical optical-mode transition zone 16 of length $I_q$ between the optical waveguide and the optical fiber.

Figure 8B:
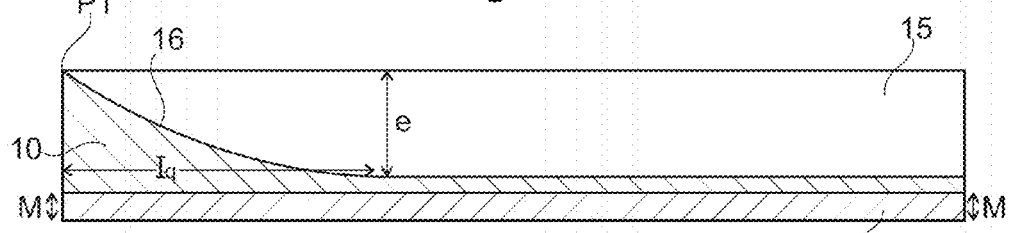
FIG. 8b shows a view of a transverse cross section taken along the axis X-X' indicated in FIG. 8a in the case where the strip zone has not been thinned.

FIG. 8b illustrates a view of a transverse cross section taken along the axis X-X' indicated in FIG. 8a in the case where the maximum depth e is such that the high-refractive-index strip 40 of the ridge optical waveguide is not thinned after the second surface S2 of the dielectric substrate has been thinned. As illustrated in FIG. 8b, the thickness M of the high-refractive-index strip after the second surface S2 has been thinned remains unchanged over the entire length of the photonic waveguide.

Figure 8C:
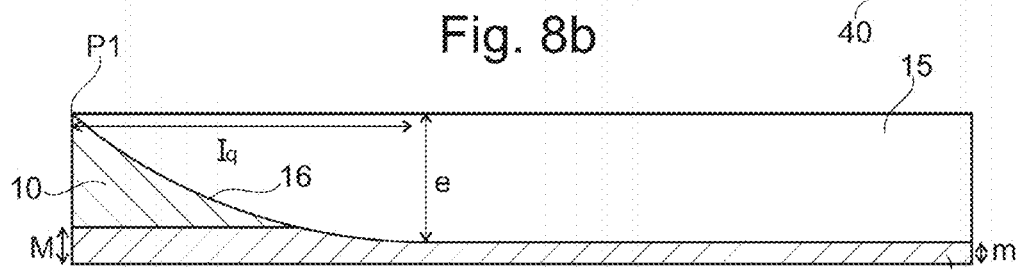
FIG. 8c shows a view of a transverse cross section taken along the axis X-X' indicated in FIG. 8a in the case where the strip zone has been thinned.

In contrast, FIG. 8c illustrates a view of a transverse cross section taken along the axis X-X' indicated in FIG. 8a in the case where the maximum depth e is such that the high-refractive-index strip 40 of the ridge optical waveguide is also thinned after the second surface S2 of the dielectric substrate has been thinned. As illustrated in FIG. 8c, a portion of the high-refractive-index strip 40 has a thickness M and another portion of the high-refractive-index strip 40 is thinned to a minimum thickness m.

Figure 8D:
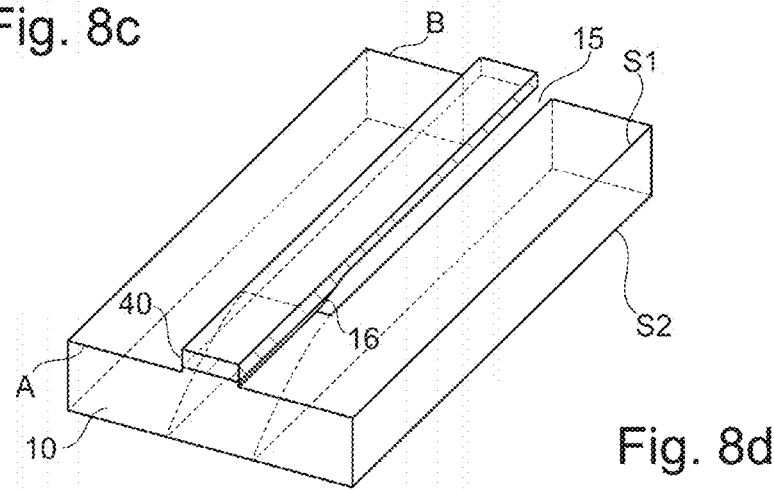

FIG. 8d illustrates a perspective view of the photonic waveguide that corresponds to the case of FIG. 8c, i.e. the maximum depth e is such that the high-refractive-index strip 40 of the ridge optical waveguide formed in the first surface S1 is also thinned after the second surface S2 of the dielectric substrate 10 has been thinned. The perspective view of FIG. 8d is the perspective view of FIG. 8a inverted. FIG. 8d illustrates a portion of the vertical transition zone 16 formed at the first end A of the photonic waveguide, which protrudes from the first surface S1 of the dielectric substrate 10. Furthermore, FIG. 8d illustrates the recess 15 after the thinning of the high-refractive-index strip 40 of the ridge optical waveguide, which corresponds to a hole shown by dashed lines.

Similarly to the thinning of the second surface S2 of the dielectric substrate 10 of FIGS. 8a-8d, the thinning of the second surface S2 of the dielectric substrate 10 may also be applied in the case of the dielectric substrate 10 of FIGS. 3c-3e.

More particularly, as mentioned above, the thinning of the second surface S2 of the dielectric substrate 10 according to the examples of FIGS. 4a-4c, 5a-5c, 6a-6c and 7a-7c may also be applied in the case of the dielectric substrate 10 of FIGS. 3b-3e.

It will be noted that in all the examples of thinning of the second surface S2 of the dielectric substrate 10 of FIGS. 4a-4c, 5a-5c, 6a-6c, 7a-7c and 8a-8d, a step of annealing or of high-temperature diffusion (at >800° C.) may be carried out after the dielectric substrate has been cut since the manufacture of the photonic waveguides using the method of FIG. 2 does not require a superstrate. In particular, the photonic waveguides manufactured by the method of FIG. 2 are able to resist the very high temperatures (>800° C.) required for diffusion and/or an anneal because there is no problem with differential expansion between substrate and superstrate, nor any problem with the temperature withstand of the bond, as is the case in the photonic waveguides of the prior art.

However, it will be noted that in the example of FIGS. 8a-8d, a superstrate may optionally be bonded to the surface S1 of the ridge optical waveguide so as to consolidate this guide during the step of thinning of the dielectric substrate. This superstrate is bonded with an epoxy adhesive, a resin or any other (metal for example) element that may subsequently be removed by exposure to laser or in a chemical bath (for example using acetone or a bath of chemical etchant). In contrast, in the photonic waveguides of the prior art the superstrate remains permanently bonded to the dielectric substrate.

In all the examples of FIGS. 4a-4c, 5a-5c, 6a-6c, 7a-7c and 8a-8d, the profile of the vertical transition zone 16 and of the vertical transition zone 16' is rounded, preferably with a radius of curvature larger than 20 mm, since it has been observed that with such a radius of curvature optical losses in the vertical transition zone are lower than 0.1 dB. However, in another example, the profile of these zones has a linear shape. Furthermore, in another example, one portion of the profile of these zones may be rounded and another portion of the profile of these zones may be linear.

By way of example, the second surface S2 of the dielectric substrate 10 may be cut mechanically. This mechanical cutting may be carried out by means of a precision circular saw, which is also used to cut the aforementioned first surface S1 of the dielectric substrate 10. One example of such a circular saw may be found in the publication "High aspect ratio lithium niobate ridge waveguides fabricated by optical grade dicing", J. Phys. D: Appl. Phys, 44 305101, (2011). As is the case in the cited publication, the blade of the circular saw is programmed in such a way that the dielectric substrate 10 is polished at the same time as the dielectric substrate 10 is cut. Criteria that are important for obtaining a high-quality polish simultaneously with cutting are the type and speed (speed of rotation and speed of translation) of the blade of the circular saw. Those skilled in the art know how to choose the type and speed of the blade of the circular saw in light of the dielectric substrate used.

In one particular example, the blade of the circular saw is gradually lowered to the maximum depth e, so that the depth of the recess varies as a circular arc of radius equal to the radius of the blade between the surface S2 of the dielectric substrate and the maximum depth e.

Figure 9:
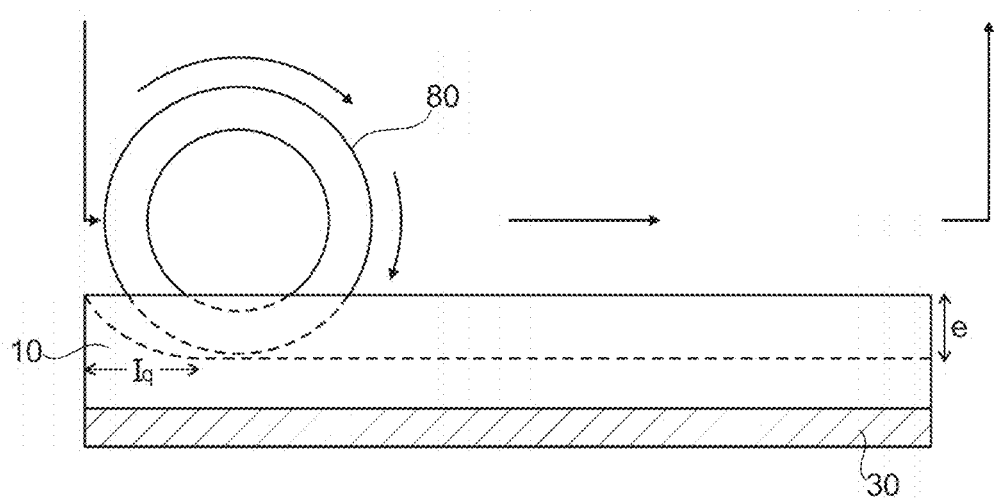

Particularly, FIG. 9 shows an example in which the surface of the dielectric substrate 10 is cut with a blade 80 of a circular saw to manufacture the photonic waveguide of FIG. 4a, in which waveguide the depth of the recess varies continuously and gradually, starting from the first end of the photonic waveguide, between a first point of zero depth at the height of the second surface S2, and a maximum depth e at a preset distance $I_q$ from the first end of the photonic waveguide.

As illustrated in FIG. 9, the blade of the circular saw is gradually lowered to the maximum depth e, so that the depth of the recess varies as a circular arc of radius equal to the radius of the blade. Once the blade 80 has reached the maximum depth e, it is moved with a translational movement parallel to the surface of the dielectric substrate 10. The path followed by the blade 80 during the cutting of the dielectric substrate 10 is shown by the arrows in FIG. 9.

In another example, the second surface S2 of the dielectric substrate 10 is cut by laser etching. According to one example, a femtosecond laser is used to cut the second surface S2 of the dielectric substrate 10. Particularly, cutting a dielectric substrate made of lithium niobate ($LiNbO_3$) or glass requires a femtosecond laser with a minimum fluence of 1 $J/cm^2$. However, it will be noted that due to the chemical and structural degradation caused by the laser spot, cutting the dielectric substrate by means of the ray of light of a femtosecond laser forms photonic waveguides that have a higher roughness than the roughness of the photonic waveguides formed by cutting the dielectric substrate by means of the blade of a circular saw.

It will be noted that the method for thinning the dielectric substrate using a circular saw or a laser etch according to the described method is simple to implement without requiring safety conditions that are constraining in comparison with the method for thinning the dielectric substrate of the prior art. Particularly, thinning the dielectric substrate using a circular saw or a laser etch only requires the use of safety glasses. In contrast, as mentioned in the description of the prior art, the method for thinning the dielectric substrate of the prior art implies constraining safety conditions (buildings subject to strict standards, a medical inspection before the start of work and periodic follow-up inspections, etc.). It will be noted that the vertical transition zone 16 is produced simultaneously with the step 200 of thinning the dielectric substrate, and hence the manufacture of the vertical transition zone 16 does not require an extra manufacturing step, in addition to that of the thinning.

Figure 1F:
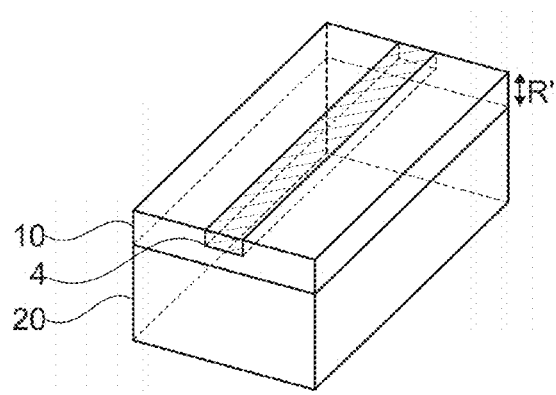
Figure 1G:
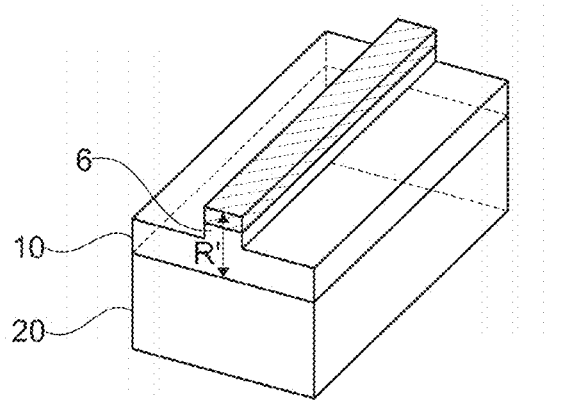

Furthermore, it will be noted that following experimentation it has been observed that a vertical optical-mode transition zone in the second surface S2 of the dielectric substrate 10 (see the vertical transition zone 16 and the vertical transition zone 16', which are illustrated in FIGS. 4a-4c, 5a-5c, 6a-6c, 7a-7c and 8a-8d) between photonic waveguides and a standard single-mode optical fiber allows insertion losses between the optical mode of the photonic waveguide and the optical mode of the standard single-mode optical fiber to be significantly decreased (by more than 3 dB in comparison with the insertion losses of the photonic waveguides of the prior art) for dielectric substrates thinned to a thickness smaller than 5 μm. In one particular experiment, the insertion losses between a ridge photonic waveguide and a standard single-mode optical fiber were measured for a ridge photonic waveguide without a vertical transition zone (see the photonic waveguide of FIG. 1g of the prior art) and for a ridge photonic waveguide with a vertical transition zone in the second surface S2 of the dielectric substrate (see the photonic waveguide of FIG. 8c). As regards to the ridge photonic waveguide without a vertical transition zone (FIG. 1g), the insertion losses for transverse electric (TE) polarizations and transverse magnetic (TM) polarizations of the electromagnetic wave are more than 3 dB higher than those of the ridge photonic waveguide of FIG. 8c with a vertical transition zone 16 for which the strip 40 is thinned to a minimum thickness m smaller than 5 μm. These additional losses from the photonic waveguide of FIG. 1g are mainly related to coupling losses (higher than 3.5 dB per facet for a thickness R' of 5 μm or less). The average propagation losses of the photonic waveguide of FIG. 8c may also be improved by 0.1 dB/cm or more in comparison with the average propagation losses of the photonic waveguide of FIG. 1g, particularly if a high-temperature annealing step is carried out at the end of the process.

Furthermore, it has been observed that in the case where the minimum thickness m of the microstrip 30 or of the strip 40 (see FIGS. 4c, 5c, 6c, 7c and 8c) is smaller than 5 µm, a strong vertical confinement of the optical mode is achieved. More particularly, it has been observed that when the minimum thickness m of the microstrip 30 or of the strip 40 is between 300 nm and 5 µm, low insertion losses are achieved at the same time as a strong vertical confinement of the optical mode. It will be noted that a strong vertical confinement is useful for decreasing the power consumption of photonic components. Specifically, a strong vertical confinement increases interactions between guided optical waves in all-optical components. It also increases interactions between guided optical waves and external electrical signals in the case of electro-optical components, thus favoring low control voltages (of about 1 V). A strong vertical confinement is also very important when the photonic waveguide is micro-structured or nano-structured with Bragg gratings or photonic crystals for example. Specifically, this vertical confinement improves the interaction between the wave guided in the microguide and the micro- or nano-structure, as is reported in the article by R. Geiss et al. "Light propagation in a free-standing lithium niobate photonic crystal waveguide", Applied Physics Letters, 97, 131109 (2010).

It will be noted that with the ion-implantation method of the prior art it is not possible to obtain a strong vertical confinement of the optical mode and at the same time low insertion losses since, as mentioned in the description of the prior art, when the dielectric substrate is thinned to a thickness smaller than 5 µm (at which strong vertical confinement begins to be seen), propagation losses and losses coupling to a standard single-mode optical fiber become substantial (higher than 3 dB).

Moreover, it will be noted that in the example in which the second surface S2 of the dielectric substrate 10 is thinned using the method of FIG. 2, resulting in a minimum thickness m of the strip (40 or 45) of between 300 nm and 5 µm, and in which the optical waveguide of the first surface S1 is a ridge optical waveguide according to the examples of FIGS. 3c-3e, the photonic waveguide provides both a strong vertical confinement and a strong lateral confinement of the optical mode. As regards the lateral confinement of the optical mode in FIGS. 3c-3e, more information may be found in French patent application no. 1450795. Thus, in this example, if the strip (40 or 45) of FIGS. 3c-3b is thinned to a minimum thickness m of 300 nm to 5 µm, strong confinement is achieved both laterally and vertically and, at the same time, low transition losses are obtained between the photonic waveguide and a standard single-mode optical fiber. In one particular example in which the optical waveguide of the first surface S1 is a ridge optical waveguide according to FIG. 3e, it has been observed that these insertion losses are 2.6 dB when the photonic waveguide includes a ridge optical waveguide having a width of 4 µm and a strip 45 with a minimum thickness m of 1 µm, whereas these losses are higher than 10 dB if there is no vertical transition zone (case of FIG. 1g for a photonic waveguide on a dielectric substrate in which the thickness R' is 1 µm).

Moreover, it will be noted that in one example of a photonic waveguide (not illustrated in the figures), the surface S1 of the dielectric substrate 10 is cut according to the example of FIG. 3b to form a ridge optical waveguide with a vertical transition zone 50 at the entrance of the photonic waveguide and the surface S2 of the dielectric substrate 10 is cut according to the example of FIG. 8c in order to form a vertical transition zone 16 on this surface S2. In this example, the optical mode is weakly confined at the entrance of the photonic waveguide (see FIG. 10), and thus coupling losses with a standard single-mode optical fiber are decreased at the entrance of the photonic waveguide, and the optical mode at the exit of the photonic waveguide (see FIG. 11) is confined laterally and vertically. It will be noted that in this example, the vertical transition zone 16 formed in the surface S2 starts from the end of the vertical transition zone 50 formed in the surface S1, i.e. from a distance $l_p$ from the end of the ridge optical waveguide making contact with the optical fiber, which end corresponds to the entrance of the photonic waveguide. Furthermore, it will be noted that in this example the strip 40 of the ridge optical waveguide is thinned (see FIG. 8c).

Figure 10:
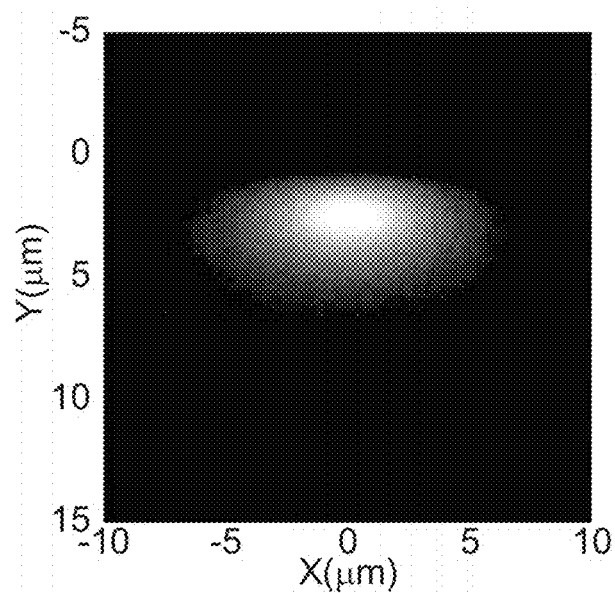
FIG. 10 shows the optical mode at the entrance of the ridge optical waveguide of a photonic waveguide according to one example of the invention.

In particular, FIG. 10 shows the optical mode at the entrance of the ridge optical waveguide of the aforementioned example of the photonic waveguide, where the vertical transition zone 50 is formed. It will be noted that the optical mode for the TE polarization at a wavelength of 1.55 µm has a lateral full width at half-maximum of 7.6 µm and a vertical full width at half-maximum (also called the depth at half-maximum) of 4.5 µm. As illustrated in FIG. 10, the optical mode at the entrance of the photonic waveguide is weakly confined.

Figure 11:
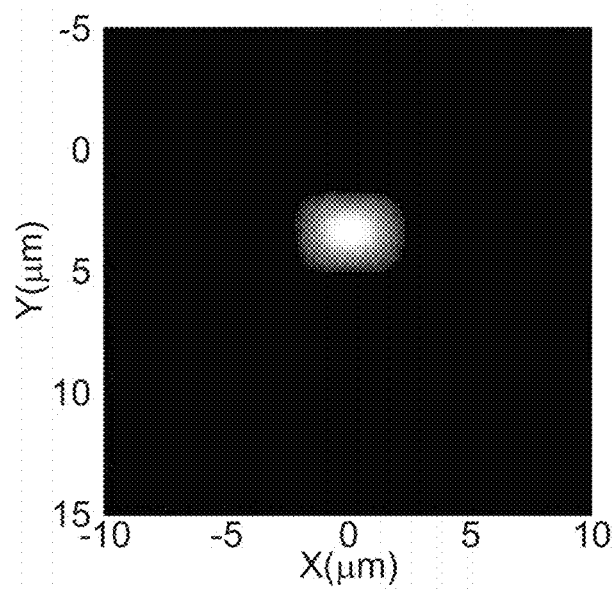
FIG. 11 shows the optical mode at the exit of the ridge optical waveguide of the photonic waveguide of FIG. 10.

FIG. 11 shows the optical mode at the exit of the ridge optical waveguide of the aforementioned example of the photonic waveguide. The optical mode for the TE polarization at a wavelength of 1.55 µm has a lateral full width at half-maximum of 3.5 µm and a vertical full width at half-maximum (also called the depth at half-maximum) of 2.5 µm. As illustrated in FIG. 11, the optical mode at the exit of the photonic waveguide is laterally and vertically confined.

Comparing FIGS. 10 and 11, it is clear that the optical mode at the entrance of the ridge optical waveguide (FIG. 10) is less confined than the optical mode at the exit of the ridge optical waveguide (FIG. 11). In particular, the photonic waveguide of the aforementioned example, which includes in its surface S1 the ridge optical waveguide of FIG. 3d, has decreased coupling losses at its entrance since the optical mode at its entrance is weakly confined and thus it is more coherent with the optical mode of a standard single-mode optical fiber, which is also weakly confined. Lateral and vertical confinement is also obtained, at the exit of this photonic waveguide, by virtue of the vertical transition zone 16 formed in the second surface S2 of the dielectric substrate of the photonic waveguide.

It will be noted that the results obtained in FIGS. 10 and 11 correspond to simulations carried out on a photonic waveguide for which the optical mode was visualized in various segments. The photonic waveguide was manufactured in a first step (step 100 of FIG. 2) by diffusing titanium into a lithium-niobate substrate, then it was cut and polished simultaneously so as to create two recesses R1, R2, which were separated by $w_r=5$ µm and such that the depth of each recess R1, R2 varied continuously and gradually between a zero depth at the height of that end of the ridge optical waveguide which was intended to receive the optical fiber, and a maximum depth $H_m$ of 10 µm. Next, the strip of the ridge optical waveguide was thinned in a second step 200 to a minimum depth m of 3.5 µm, with a vertical transition zone 16 having a radius of curvature of 28 mm.

It will be noted that, in the photonic waveguides manufactured using the method of FIG. 2, the vertical transition zone 16 was produced in the surface opposite the microstrip optical waveguide or the ridge optical waveguide and thus the fundamental mode was only slightly disrupted in the vertical transition zone 16. Thus, no optical modes other than the fundamental optical mode were excited. In contrast, in the photonic waveguide of the prior art, optical modes other than the fundamental optical mode are excited, as mentioned in the description of the prior art.

Photonic waveguides manufactured using the method of FIG. 2 may be used in many fields such as for example the aerospace field, the optical telecommunications field, the field of electromagnetic detection and the field of lasers.

It will also be noted that in one particular application of the method of FIG. 2, electrodes may be deposited on either side of the microstrip 30 (or of the strip 40 or 45) in a step after the manufacturer of the microstrip 30 (or of the strip 40 or 45), so as to produce an electro-optical photonic component. These electrodes may be coplanar and deposited on the surface S1 of the dielectric substrate of the photonic waveguide using lithography techniques that are well known to those skilled in the art. They may also be deposited on the surface S1 of the dielectric substrate of the photonic waveguide and in the recess 15, after a buffer layer, well known to those skilled in the art, has been deposited so as to place them on either side of the photonic waveguide.

Furthermore, it will be noted that the method of FIG. 2 is particularly suitable for graded-index optical waveguides in which the electromagnetic wave is guided by virtue of a continuous lateral and vertical variation in the refractive index.

The invention claimed is:

1. A method for manufacturing a photonic waveguide with low insertion losses between the photonic waveguide and an optical fiber, the method including the following steps:

forming an optical waveguide on a first surface of a dielectric substrate; and thinning the dielectric substrate in order to form a photonic waveguide having a first end and a second end opposite the first end;

wherein the thinning is carried out by cutting a second surface of the dielectric substrate, which surface is opposite the first surface, the thinning comprising forming a recess the profile of which is parallel to the optical waveguide, the depth of the recess varying continuously and gradually between a first point P1 of zero depth at the height of the second surface, and a maximum depth at a preset distance from the first end of the photonic waveguide, which end is intended to receive the optical fiber, the variation in the depth of the recess forming a vertical optical-mode transition zone of length between the photonic waveguide and the optical fiber.

2. The method as claimed in claim 1, wherein the optical waveguide is a microstrip optical waveguide including a high-refractive-index microstrip 30.

3. The method as claimed in claim 2, wherein after the dielectric substrate has been thinned, the microstrip 30 is thinned to a minimum thickness between 300 nm and 5 µm.

4. The method as claimed in claim 1, wherein the optical waveguide is a ridge optical waveguide formed by a high-refractive-index strip and by cutting two recesses that are parallel and spaced apart by a distance $w_r$ on the first surface of the dielectric substrate, the cutting being such that the depth of the two recesses remains the same the entire length of the dielectric substrate 10.

5. The method as claimed in claim 4, wherein after the dielectric substrate has been thinned, the strip is thinned to a minimum thickness between 300 nm and 5 µm.

6. The method as claimed in claim 1, wherein the optical waveguide is a ridge optical waveguide formed by a high-refractive-index strip and by cutting two recesses that are parallel and spaced apart by a distance $w_r$ on the first surface of the dielectric substrate, the cutting being such that the depth of each recess varies continuously and gradually between a zero depth at the height of the first end of the optical waveguide, which end is intended to receive the optical fiber, and a maximum depth at a preset distance from the first end of the optical waveguide, the variation in the depth of each recess forming a vertical optical-mode transition zone of length ($l_p$) between the ridge optical waveguide and the optical fiber.

7. The method as claimed in claim 6, wherein the depth of each recess decreases starting from the first end of the optical waveguide or starting from a preset distance from the first end of the optical waveguide.

8. The method as claimed in claim 6, wherein the cutting is such that the depth of each recess varies continuously and gradually between a zero depth at the height of the second end of the optical waveguide and a maximum depth at a preset distance from the second end of the optical waveguide, which end is intended to receive an optical fiber, the variation in the depth of each recess forming a vertical optical-mode transition zone of length between the ridge optical waveguide and the optical fiber.

9. The method as claimed in claim 1, wherein the depth of the recess decreases starting from the first end of the photonic waveguide.

10. The method as claimed in claim 9, wherein the second surface of the dielectric substrate is cut such that the depth of the recess varies continuously and gradually between a second point P2 of zero depth at the height of the second surface, and a maximum depth at a preset distance from the second end of the photonic waveguide, which end is intended to receive an optical fiber, the variation in the depth of the recess forming a vertical optical-mode transition zone of length between the photonic waveguide and the optical fiber.

11. The method as claimed in claim 10, wherein the depth of the recess decreases starting from the second end of the photonic waveguide or starting from a preset distance from the second end of the photonic waveguide.

12. The method as claimed in claim 1, wherein the depth of the recess decreases starting from a preset distance starting from the first end of the photonic waveguide.

13. The method as claimed in claim 1, wherein the cutting is carried out by means of a circular saw including at least one blade.

14. The method as claimed in claim 13, wherein the blade is gradually lowered to the maximum depth, so that the depth varies as a circular arc of radius equal to the radius of the blade.

15. A photonic waveguide wherein it is manufactured by the method as claimed in claim 1.

* * * * *